United States Patent [19]
Berner et al.

[11] Patent Number: 5,923,877
[45] Date of Patent: Jul. 13, 1999

[54] OBJECT-ORIENTED PROGRAMMING MEMORY MANAGEMENT FRAMEWORK AND METHOD

[75] Inventors: Andrew J. Berner, Irving; Nathan S. Fish, Plano; Sarah V. Denney, Allen, all of Tex.

[73] Assignee: Electronic Data Systems Corporation, Plano, Tex.

[21] Appl. No.: 08/641,466

[22] Filed: May 1, 1996

[51] Int. Cl.⁶ .................................................. G06F 9/45
[52] U.S. Cl. ............................................................ 395/703
[58] Field of Search ................................... 395/683, 703; 707/103, 205, 206; 711/159, 160, 165; 364/281.1, 967.4, 967.5

[56] References Cited

U.S. PATENT DOCUMENTS

| | | | |
|---|---|---|---|
| 4,961,137 | 10/1990 | Augusteijn et al. | 707/206 |
| 5,136,706 | 8/1992 | Courts | 707/206 |
| 5,321,834 | 6/1994 | Weiser et al. | 707/206 |
| 5,367,633 | 11/1994 | Matheny et al. | 345/514 |
| 5,398,334 | 3/1995 | Topeka et al. | 707/206 |
| 5,446,901 | 8/1995 | Owicki et al. | 395/683 |
| 5,485,613 | 1/1996 | Engelstad et al. | 707/206 |
| 5,535,390 | 7/1996 | Hildebrandt | 395/683 |
| 5,581,760 | 12/1996 | Atkinson et al. | 395/703 |
| 5,652,883 | 7/1997 | Adcock | 707/206 |
| 5,680,619 | 10/1997 | Gudmundson et al. | 395/701 |
| 5,689,707 | 11/1997 | Donnelly | 395/183.18 |
| 5,717,877 | 2/1998 | Orton et al. | 345/507 |

OTHER PUBLICATIONS

IBM Technical Disclosure Bulletin, vol. 37, No. 2B, Feb. 1, 1994, p. 697/698, "Ensuring Internal Consistency in a Set of Interconnected Classes".

IBM Technical Disclosure Bulletin, vol. 37, No. 1, Jan. 1, 1994, p. 215/216, "Object De–Reference as an Alternative to Garbage Collection".

*Primary Examiner*—Tariq R. Hafiz
*Assistant Examiner*—John Q. Chavis
*Attorney, Agent, or Firm*—L. Joy Griebenow; Baker & Botts L.L.P.

[57] ABSTRACT

An object-oriented memory management framework (10) and method therefor provide for a foreign pointer class (14, 400) and a foreign object class (12) each having a plurality of encapsulated methods and variables for memory management. The foreign pointer class (14) provides one or more instances of active, passive, and restrictive foreign pointers (274, 284, 292). The framework (10) further includes a foreign object class (12) for providing one or more instances of foreign objects (16), where each foreign object (16) encapsulated an active list variable (32), a passive list variable (36), and a restrictive list variable (34) for recording therein any foreign pointer pointing thereto.

41 Claims, 7 Drawing Sheets

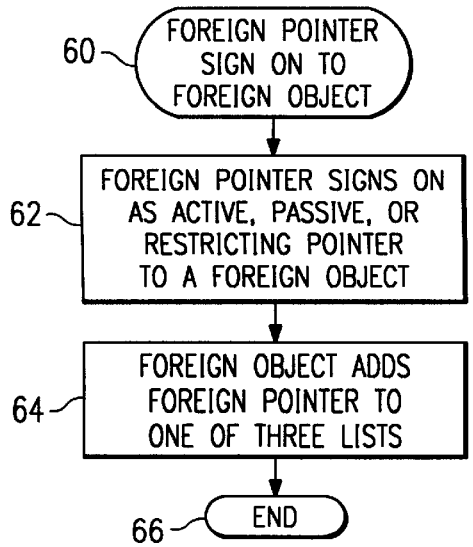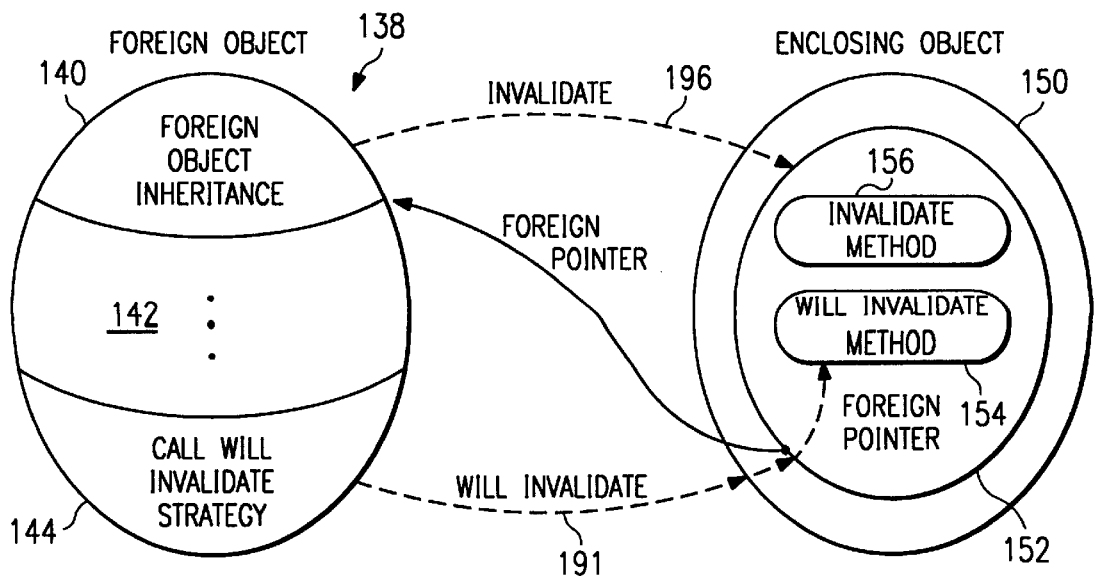

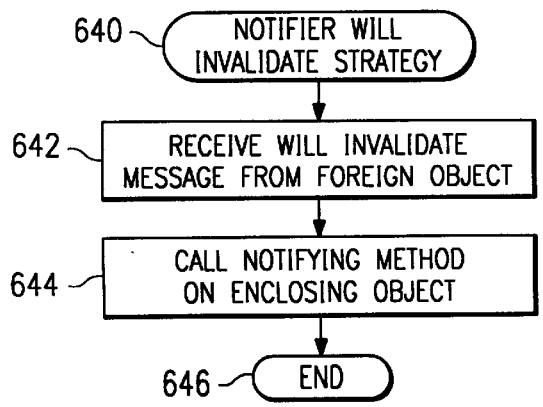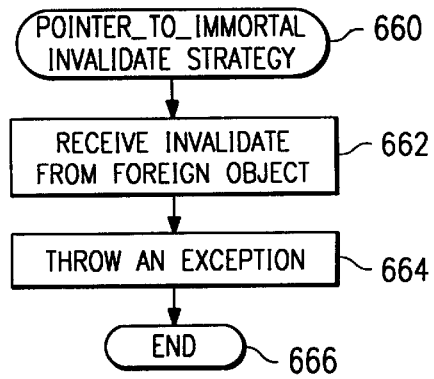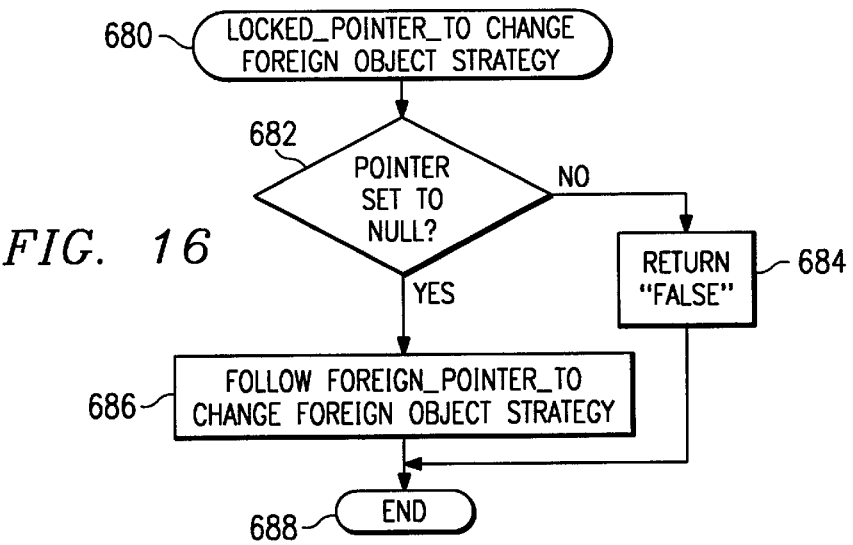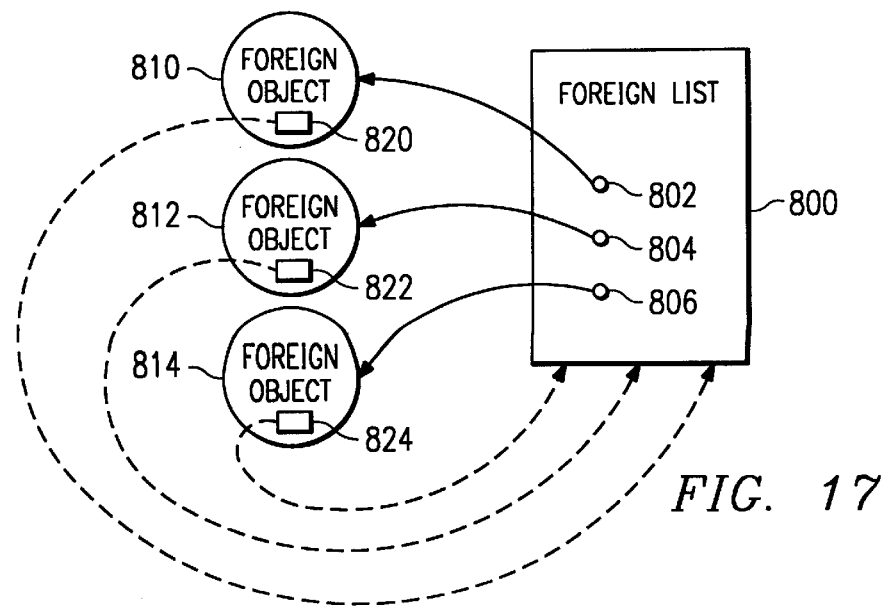

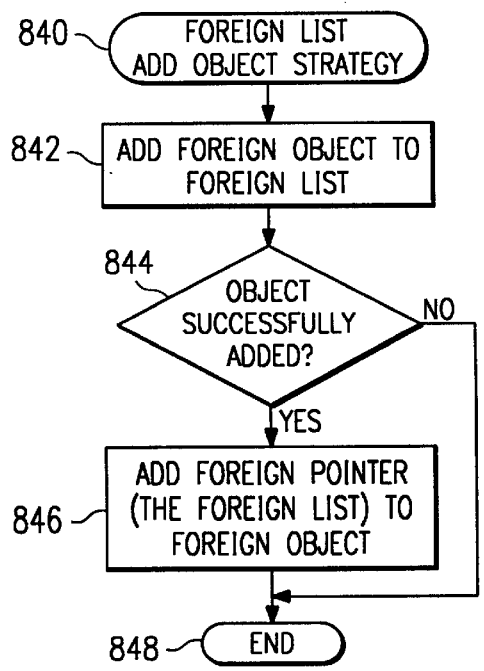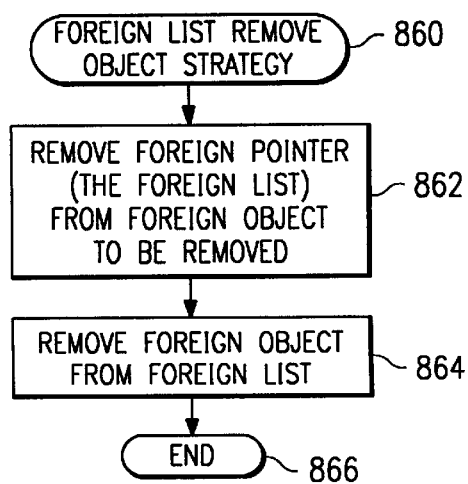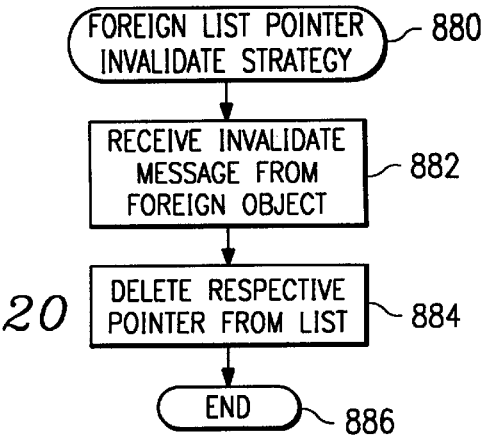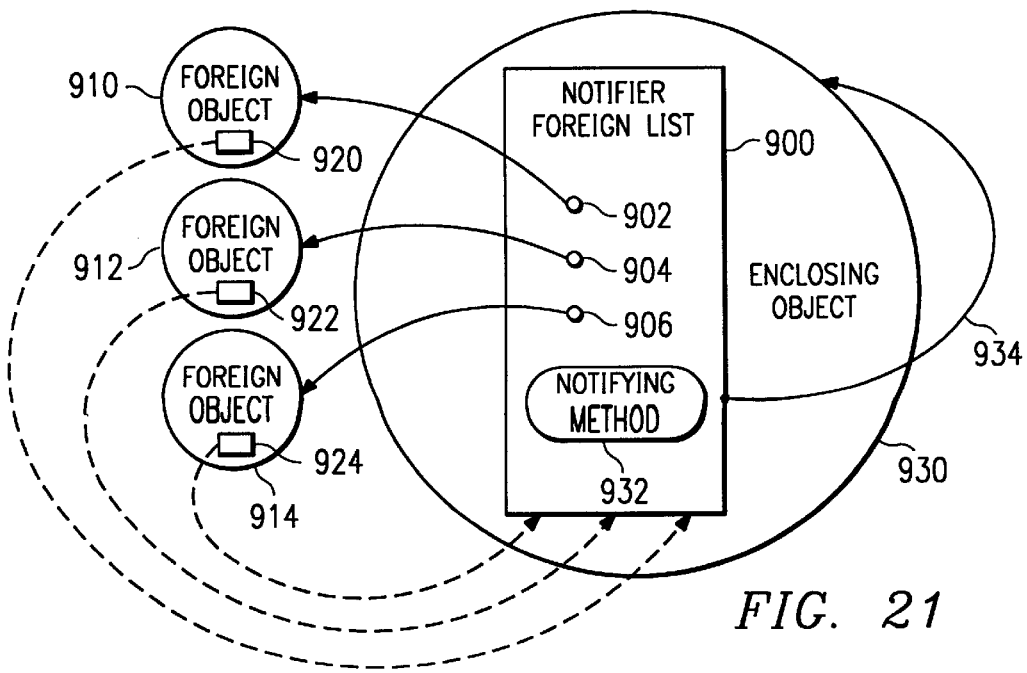

OBJECT-ORIENTED PROGRAMMING MEMORY MANAGEMENT FRAMEWORK AND METHOD

BACKGROUND OF THE INVENTION

Memory management is one of the most difficult, most error-prone, but also most important aspects of object-oriented programming. An object-oriented program implemented in C++, for example, is based around a collection of objects which represent either a physical or abstract part of the world which the program addresses. When the program runs, memory must be allocated for those objects. The C++ language has two operators, "new" and "delete", related to memory allocation. The programmer uses operator "new" to allocate memory for an object and uses operator "delete" to free up the allocated memory when the object is no longer needed by the program. It may be seen that the task of memory management is primarily a decision of when to call operator "delete".

Objects within the program may refer to each other by having pointers to the allocated memory. For example, an employee object may have a pointer to the memory allocated for the object representing that employee's manager. Objects can send messages to the object they point to, so that they can receive information and give commands from and to the object. These operations may result in a change in the memory location pointed to. Several memory management problems related to the use of pointers require careful attention and consideration by the programmer. These problems include wild pointers, limited memory, and memory leaks.

The central problem with memory management is that an object with a pointer to another object is not notified when that object is deleted so that the pointer is no longer valid. This is known as a wild pointer problem in the computer programming industry. If an object then sends a message to the now deleted object via the wild pointer, the results are often unpredictable. The program may crash immediately, the results may be invalid, or, as is frequently the case, the method on the wild pointer starts a chain reaction of invalid operations that leads to a crash at a later point in the program. It is extraordinarily difficult to debug such occurrences. There is a saying in the industry: "the result of even one wild pointer is pain, misery, and death." (C++ FAQs by Cline and Lomow, pg 324).

One way to avoid wild pointers is never to call operator "delete". This may be a valid solution only if the program has an unlimited amount of memory for its use. Typically, a program will deal with many more objects during the entire run of the program than it needs at any one time. Therefore, it is impractical and unrealistic to continue to maintain memory space for unused objects.

Even if there is enough memory to allocate all objects an application needs, if some objects allocated by operator "new" during program execution are not deleted at some point during program execution, the allocated memory remains unavailable for other programs or additional runs of the same program until the computer is restarted. This problem is commonly called a memory leak. When a program with a memory leak is run repeatedly, eventually the leak is so severe that other programs will crash or new programs cannot be started even if no other program is running.

To avoid the problems of wild pointers, limited memory, and memory leaks, the programmer must delete each object at the right time. Determining when is the right time is very difficult. Although C++ provides one basic way of allocating dynamic memory, the allocated objects are used for diverse reasons. The "right time" to delete the objects depends on the way these objects and pointers pointing to them are used.

One use for pointers is to point to one object which may be a part of another object. For example, a video tape may have several video segments recorded on it, so each video segment object is a part of a video tape object. In order to know which tape object a video segment object is a part of, the video segment object may have a back pointer to a tape object. It may be seen that when a video tape object is deleted, all video segment objects that have a back pointer to it should also be deleted to avoid generating wild pointers.

Another difficulty is posed when one object may have a list of objects of another type. A video tape object may include a list of video segment objects it contains. Additionally, a planned broadcast object may have a list of video segment objects residing on one or more video tape objects that will be shown during the course of the broadcast. Further, the same video segments may be used for several broadcasts, and therefore are listed on several broadcast lists at the same time. Each list that contains an object has a pointer to that object. When an object containing a list is deleted, the list is also deleted. The difficult memory management decision, however, is whether the individual objects on the list should also be deleted. In this example, when a broadcast object is deleted from memory, the video segment objects may not be, in general, deleted. However, when a video tape object is deleted, all the video segment objects on its list should also be deleted. The C++ language does not provide any explicit syntax for making the distinction between these two types of relationships. The programmer must provide explicit code to properly distinguish and treat these two cases differently or wild pointers may result.

A further difficulty is posed when an object may also be temporarily related to another object. For example, a video cassette recorder (VCR) may be playing a video tape. In this case, the VCR object has a pointer to the video tape object. Syntactically, this relationship appears the same as the back pointer that a video segment object has to its video tape. However, unlike the back pointer example, the VCR object should not be deleted when the video tape object is deleted. In fact, the VCR object may point to different video tape objects at different points in the broadcast, or may not point to any video tape object at all. This difference in relationship requires distinction and different memory management strategies.

In all the above examples, the objects pointed to are sharable; that is, many objects may have pointers to the same object. Another common use of pointers is for an object that is owned by another object and should only be pointed to by the owning object. For example, a VCR object may have a strategy for what it does when it reaches the end of a tape: rewind the tape and play it again, rewind it and eject it, or just stop. In object-oriented programming, objects can represent actions such as these end-of-tape strategies. Therefore, the VCR object has a pointer to a strategy object, which may change during the course of a broadcast. In this scenario, different VCR objects are not pointing to the same strategy objects, but a new strategy object is created for each VCR object. This relationship is called "remote ownership" and typically requires a different memory management strategy to avoid problems.

One of the biggest advantages of object-oriented programming is the ability to reuse objects in multiple applications without having to modify the original code. To allow for code reuse, new objects must be able to point to previously coded objects without change to the previously written code. Such pointers are called anonymous pointers, such that the class pointed to has no code specifically referring to the class with the pointer. Deletion of objects pointed to by anonymous pointers is another primary cause of wild pointers.

In conventional programming, memory management must be explicitly and carefully coded for each and every object. Often explicit coding is used to manage anonymous pointers. For example, when a broadcast object is deleted, the video segments it uses should not be deleted since one or more of them may be scheduled to be shown in other broadcasts. However, a video segment object should be deleted if is not needed by other broadcasts. The programmer may manage this by writing explicit code to maintain a list of all open broadcasts and their video segments, which is referred to when a broadcast is deleted. There may be other business reasons to delete an object. For example, if a video segment object is deleted because of censorship, it should be deleted from all broadcasts. The programmer is required to write specific code to check all broadcasts and delete the video segment from all broadcasts scheduled to use it. Such explicit coding goes directly against the basic object-oriented design principles of encapsulation and reuse. In addition to being time consuming and error-prone to implement, the explicit code has to be modified everywhere it is in place when the application is expanded or the objects are reused in another context.

Garbage collection is a known technique for automatically managing memory based on the concept of scope of a variable. A garbage collection product is Great Circle made by Geodesic Systems of Chicago, Ill. When memory is allocated for an object, but no currently active variable points to that object, the object can be automatically deleted without specific code written by the programmer. The disadvantage with automatic garbage collection is that it is based on the syntax of pointers in memory. For example, garbage collection schemes cannot distinguish between removing a video segment from one broadcast because it is not scheduled to be shown next time, and removing a video segment from its video tape because it is censored and should not be shown on any broadcast ever again. Explicit coding is still required to fill in this gap.

Some other techniques have been developed to solve some memory management problems but are not complete solutions. The smart pointer from the C++ compiler from Borland International Inc., Scotts Valley, Calif., for example, handles only the problem of remote ownership. Reference counting wrappers are also available to enable programmers to keep track of how many objects point to a particular object with simplified code. However, these techniques do not address all memory management problems encountered.

Currently, conventional memory management is done in a haphazard and tedious manner, which may require many sleepless hours to code and debug. Most often, software products are made available to the consumers before problems of improper memory management are completely resolved. The result is the sometimes frequent appearance of dialog windows informing users some non-specified error has occurred popping up on computer terminals and locked-up computer applications.

SUMMARY OF THE INVENTION

Accordingly, there is a need for a framework and method for providing memory management in object-oriented programming to avoid wild pointer and other problems.

In accordance with the present invention, a memory management framework and method are provided which eliminates or substantially reduces the disadvantages associated with prior programming practices.

In one aspect of the invention, an object-oriented memory management framework includes a foreign pointer class having a plurality of encapsulated methods and variables for memory management. The foreign pointer class provides one or more instances of active, passive, and restrictive foreign pointers. The framework further includes a foreign object class for providing one or more instances of foreign objects, where each foreign object encapsulated an active list variable, a passive list variable, and a restrictive list variable for recording therein any foreign pointer pointing thereto.

In another aspect of the invention, a method for memory management in object-oriented programming includes the steps of encapsulating memory management methods and variables in a foreign pointer class, and a foreign object class. The foreign pointer class provides one or more instances of active, passive, and restrictive foreign pointers for conveying diverse relationships. Each foreign object has encapsulated an active list variable, a passive list variable, and a restrictive list variable for recording any foreign pointer pointing thereto.

BRIEF DESCRIPTION OF THE DRAWINGS

For a better understanding of the present invention, reference may be made to the accompanying drawings, in which:

FIG. 3 is a simplified flowchart of an exemplary foreign pointer sign-on process;

FIG. 4 is a simplified block diagram showing an exemplary destroy foreign object process by the transmission of a "Will invalidate" message and an "Invalidate" message;

FIG. 5 is a simplified flowchart of an exemplary destroy foreign object process;

FIG. 14 is a simplified flowchart of an exemplary notifier_pointer_to will invalidate process;

FIG. 15 is a simplified flowchart of an exemplary pointer_to_immortal invalidate strategy;

FIG. 16 is a simplified flowchart of an exemplary locked_pointer_to change foreign object strategy;

FIG. 17 is a simplified block diagram of a foreign list;

FIG. 18 is a simplified flowchart of an exemplary foreign list add foreign object strategy;

FIG. 19 is a simplified flowchart of an exemplary foreign list remove foreign object strategy;

FIG. 20 is a simplified flowchart of an exemplary foreign list pointer invalidate strategy; and FIG. 21 is a simplified block diagram of a notifier foreign list.

DETAILED DESCRIPTION OF THE INVENTION

Figure 1:
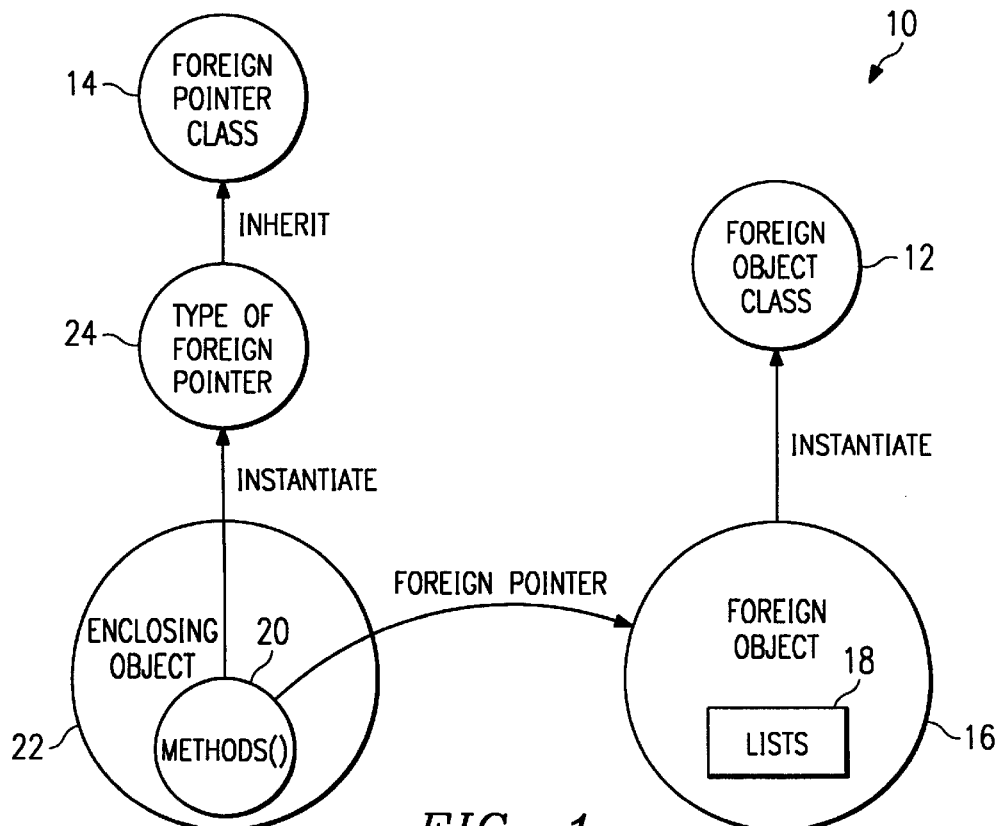
FIG. 1 is a simplified block diagram of a foreign object and a foreign pointer.

The preferred embodiment(s) of the present invention is (are) illustrated in FIGS. 1–20, like reference numerals being used to refer to like and corresponding parts of the various drawings.

Referring to FIG. 1, a framework 10 defining two classes that encapsulate methods and variables are foreign object class 12 and foreign pointer class 14, according the teachings of the present invention. Foreign object and pointer classes 12 and 14 are used as base classes or super classes for application-specific classes coded by the programmer. Foreign object and pointer classes 12 and 14 function together to encapsulate the basic methods of memory management according to the teachings of the present invention.

Figure 2:
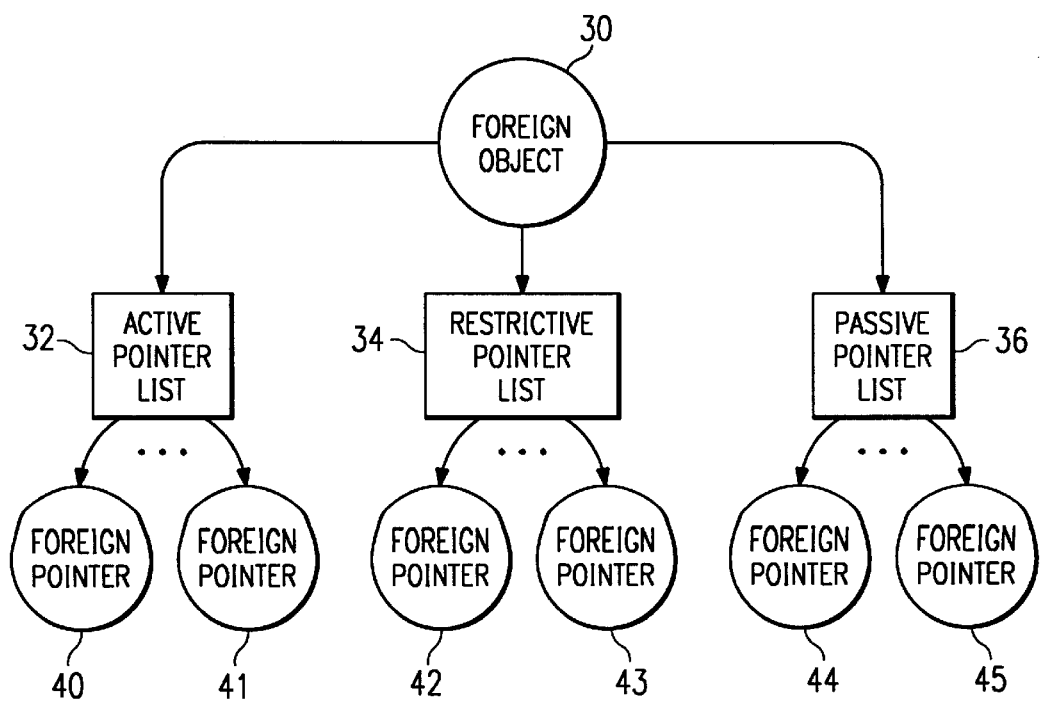
FIG. 2 is a simplified block diagram of a foreign object and its lists of active, restrictive, and passive foreign pointers.

Foreign object class 12 may be used as a base class for any class of objects requiring memory management. The programmer may do so by deriving a business class as "public virtual foreign object". Foreign pointer class 14 is a pure virtual class that encapsulates communication methods with foreign objects 16 that inherit from foreign object class 12. As shown, foreign object 16 is an instance of foreign object class 12 and includes lists 18 which keep track of foreign pointers 20 that are pointed thereto. Foreign pointer 20 is enclosed by an enclosing object 22 and is an instance of a type of foreign pointer 24 as defined in framework 10. The specific type of foreign pointer 24 has inherited specific behaviors from foreign pointer class 14. Foreign pointer 20, constructed in this manner, is used instead of the conventional pointers to point to foreign objects 16. As shown in FIG. 2, each foreign object 30 maintains three lists: active, restrictive, and passive foreign pointer lists 32–36. Each list records the foreign pointers 40–45 of each type that point to foreign object 30. This structure supports the use of anonymous pointers since neither the foreign object nor the actual business classes derived from it need to contain explicit code about particular types of pointers or the business classes that contain those pointers. The particular kind of foreign pointer used by an object to point to a foreign object determines the memory management behavior and strategy. When a foreign object is deleted, it sends a special message, "invalidate", to each of the foreign pointers that point to it, regardless of type. The foreign pointers then executes their respective memory management strategy. This behavior is encapsulated in foreign pointers without programmer's explicit coding.

Referring to FIG. 3, an exemplary flowchart 60 illustrates how foreign pointers may be initiated. In block 62, each foreign pointer, when initiated, signs on as active, passive, or restrictive pointer. In response, the foreign object being pointed to by the pointer adds the new pointer to one of its active, restrictive, and passive pointer lists 32–36 (FIG. 2), as shown in block 64. The initiation then terminates in block 66.

FIGS. 4 and 5 illustrate a process for destroying a foreign object to remove it from memory by calling the "delete" operator or destructor in C++, for example. FIG. 4 shows an exemplary process flow and FIG. 5 is a simplified block diagram. Referring first to FIG. 4, a foreign object 138, like any object-oriented object, has a layered structure with multiple layers 140–144. Topmost layer 140 contains the behavior inherited from the foreign object class. Subsequent layers 142 describe other behavior, with the bottom-most layer 144 containing a destructor of the business class. The programmer may optionally insert a call to a "will invalidate" strategy into the destructor. The function of the will invalidate strategy is described below. As it is true with all objects, when an object is being destroyed, it is deleted in layers, beginning with the bottom-most layer. An enclosing object 150 includes a foreign pointer 152 pointing to foreign object 138 that has encapsulated an invalidate method 154 and a will invalidate method 156.

Referring also to FIG. 5 for the destroy foreign object process flow beginning in block 190, foreign object 138 may optionally send a "Will invalidate" message 191 to each foreign pointer pointing to it, as shown in block 192, by inserting a call therefor in the destructor or bottom-most layer 144 of foreign object 138. Each foreign pointer, including foreign pointer 152, upon receiving "Will invalidate" message 191, uses its own will invalidate strategy 154 and operates accordingly, as shown in block 194.

Subsequently upon completion of the foreign pointer's will invalidate strategy 154, foreign object 138 sends an "Invalidate" message 196 from its topmost layer 140 (which has the foreign object inheritance) to each foreign pointer 152 pointing to it, as shown in block 202. Each foreign pointer 152 then proceeds to executes its own invalidate strategy 156, a shown in block 204, with the end result that each foreign pointer no longer points to the foreign object, as shown in block 206. Foreign object 138 is then completely deleted, as shown in block 208. The process ends in block 210.

Constructed in this manner, if enclosing object 250 desires to perform certain operations, such as obtaining some information from foreign object 138 immediately prior to foreign object's deletion from memory, it has the opportunity to do so upon the receipt of "Will invalidate" message 191. Without this special mechanism, by the time foreign object 138 issues "Invalidate" message 196 from its topmost layer 140, all layers below topmost layer 140 has already been deleted. Therefore, it would be too late for enclosing object 150 to perform the desired operations by the time it receives "Invalidate" message 196.

Figure 6A:
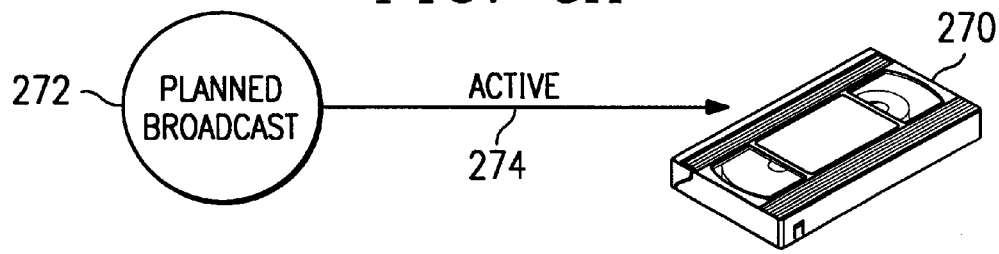
FIGS. 6A–6C are simplified diagrams illustrating the exemplary scenarios in which active, passive, and restrictive foreign pointers are used.
Figure 6B:
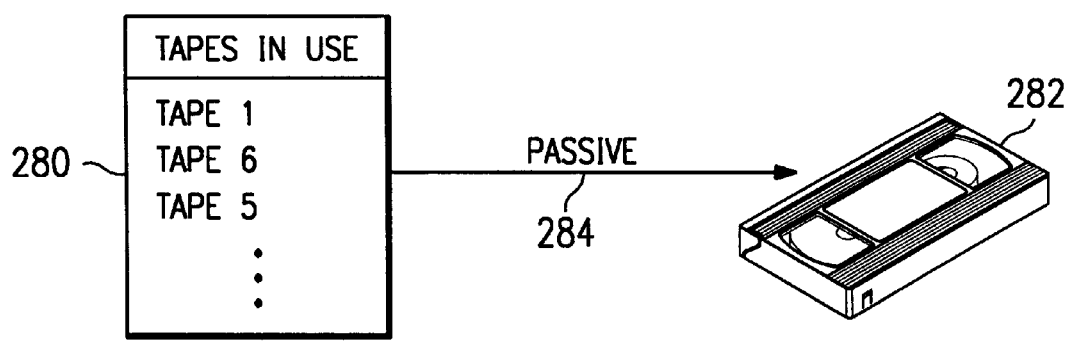
Figure 6C:
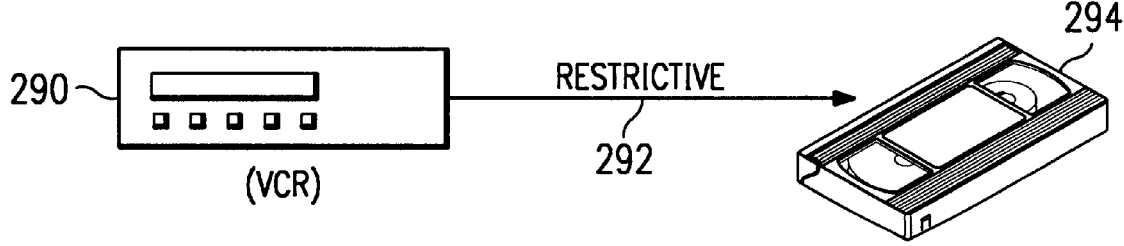

As set forth above in FIG. 2, a foreign pointer may be one of three types. For example, a video tape object may be pointed to by multiple objects using different types of foreign pointers: active, passive, and restrictive. FIGS. 6A–6C provide exemplary applications for the three types of foreign pointers. For example, a planned broadcast business application 272, which is a schedule of a television broadcast, may point to a video tape object 270 with an active pointer 274. This indicates that broadcast 272 plans to show tape 270. On the other hand, a window list box 280 displayed on a terminal listing all the tapes currently in use may point to video tape 282 with a passive pointer 284. Further, a video cassette recorder (VCR) object 290 may use a restrictive pointer 292 to point to a video tape object 294 when the tape is inserted into the VCR.

The active, passive, and restrictive distinction may be illustrated with the scenario that something has occurred so that the last object pointing to the video tape is broadcast 272, list box 280, or VCR 290. If planned broadcast 272 becomes the last object to point to video tape 50 with an active foreign pointer 274, video tape object 270 should not be deleted from memory because an active foreign pointer is involved. However, there may exist overriding reasons, such as censorship, to insist that video tape 270 be delete from memory. Video tape 270 may be deleted as long as planned broadcast 272 is notified.

In contrast, if list box 280 listing all the tapes currently in use becomes the last object to point to video tape 282, this is insufficient reason to keep video tape object 282 in memory, because a passive foreign pointer 284 is involved. Conceptually, if a tape object is not pointed to by anything else but passive pointers, it has outlived its usefulness. Thus, if an object is pointed to by only passive pointers, it may be deleted.

In the case of restrictive pointer 292, video tape object 294 should not be deleted at all because it is currently being used by VCR 290. Thus, an object being pointed to by one or more restrictive pointers are not to be deleted.

Figure 7:
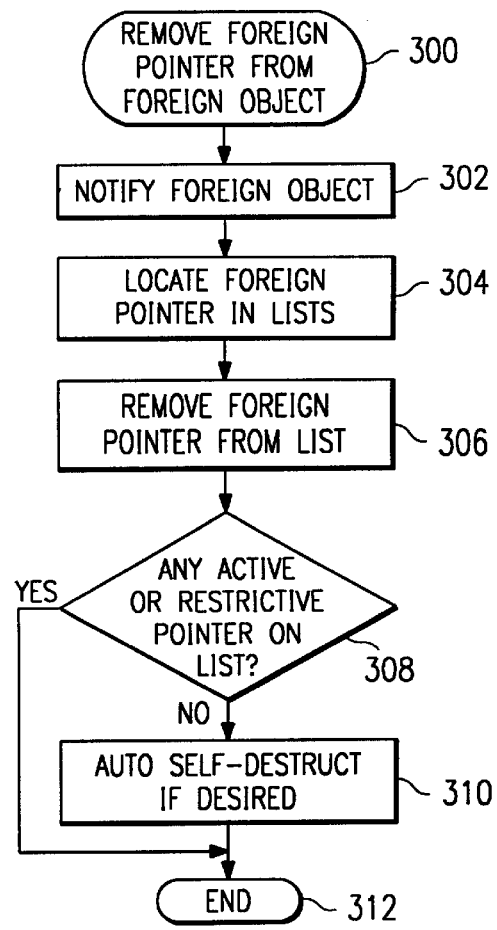
FIG. 7 is a simplified flowchart of an exemplary remove foreign pointer from foreign object process.

FIG. 7 is a flowchart representing an exemplary process 300 to remove a foreign pointer from a foreign object. Refer also to FIGS. 1 and 2 for block diagrams showing the structures of the objects involved. In block 302, foreign object 16 that was pointed to by foreign pointer 20 is first notified. Foreign object 30 searches its three lists of active, passive and restrictive pointers 32–36 and locates the present pointer in one of the lists, as shown in block 304. Foreign pointer 20 is then removed from the appropriate list, as shown in block 306. If the removed foreign pointer was the last active or restrictive pointer in that foreign object's lists and no other active or restrictive pointers remain in the lists, as determined in block 308, then the foreign object may automatically self-destruct to delete itself from memory, as shown in block 310. The automatic self-deletion may be performed since the only remaining foreign pointers pointing to the foreign object, if any, are passive pointers. Execution then ends in block 312.

Figure 8:
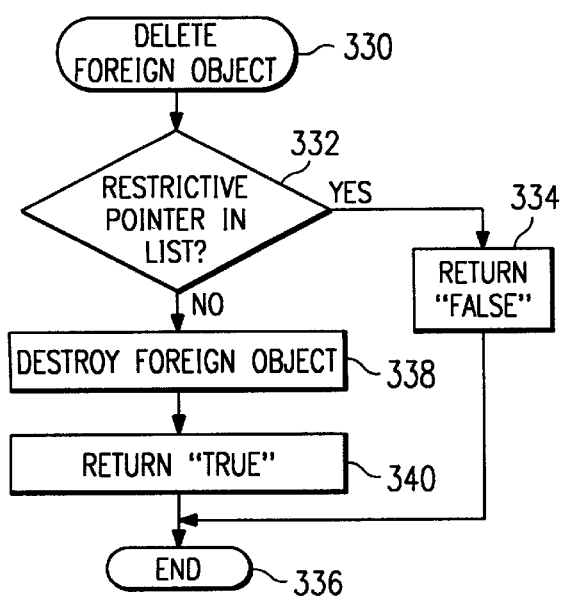
FIG. 8 is a simplified flowchart of an exemplary delete foreign object process.

Referring to FIG. 8, an exemplary delete foreign object process flow is shown, beginning in block 330. Delete foreign object 330 may be called when a programmer desires to remove a foreign object from memory. Delete foreign object 330 first examines restrictive foreign pointer list 34 (FIG. 2) of foreign object 30 to determined whether any restrictive pointer is currently pointing to foreign object 30, as shown in block 332. If list 34 shows that one or more restrictive pointers are currently pointing to foreign object 30, then a predetermined value, such as boolean false, is returned in block 334 before the process ends in block 336. The return value is indicative of whether the foreign object was successfully deleted.

If restrictive pointer list 34 shows no restrictive pointer currently points to foreign object 30, then the destroy foreign object method shown in FIG. 5 is called, as shown in block 338. A predetermined value, such as true, is then returned to indicate that the foreign object was deleted, as shown in block 340, before the process terminates in block 336.

It may be seen from the foregoing that the type of foreign pointer dictates how the removal of a foreign pointer from a foreign object and the deletion of a foreign object are performed. Thus, memory management strategies differ depending on whether the foreign pointer involved is an active, a passive, or a restrictive pointer.

Figure 9:
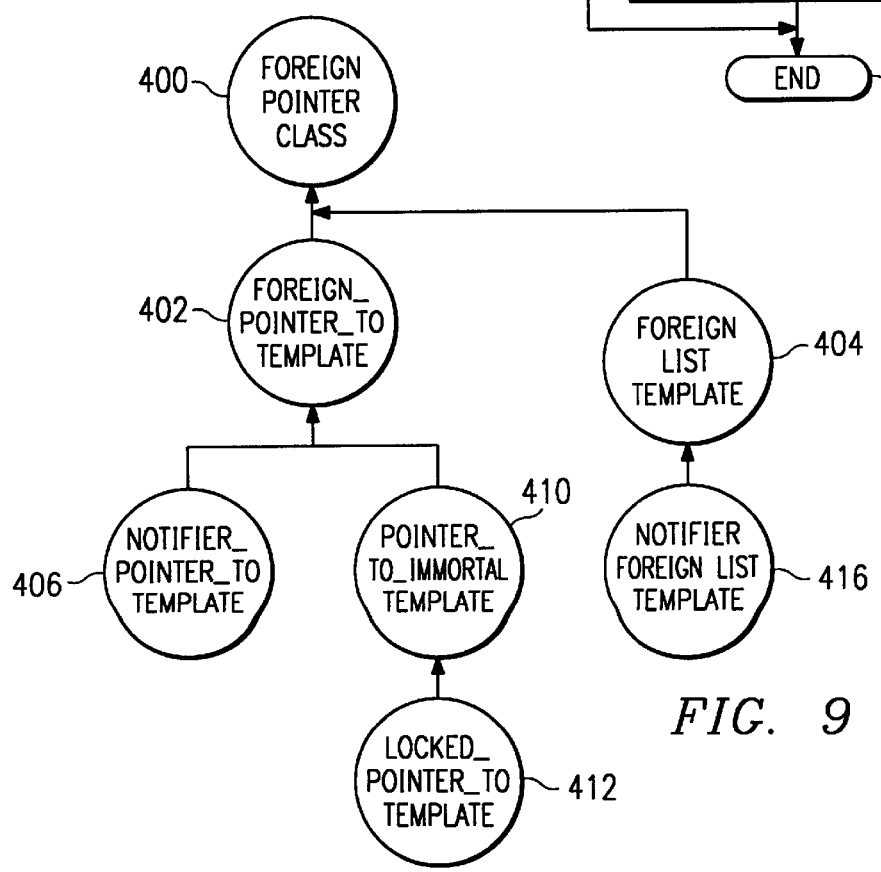
FIG. 9 is a simplified class inheritance diagram.

FIG. 9 is a class hierarchy of foreign pointer class 400 according to framework 10 of the present invention. Two subclasses inherit from foreign pointer class 400: foreign_pointer_to 402 and foreign list 404. Foreign_pointer_to subclass 402 is a template class of singular foreign pointers, i.e., pointers that only point to one foreign object. Foreign list 404, on the other hand, is a template class of foreign pointers that point to more than one foreign object. More specialized template classes inherit from foreign_pointer_to class 402: notifier_pointer_to 406, pointer_to_immortal 410, and pointer_to_immortal 410. A further template class, locked_pointer_to 412, inherits from pointer_to_immortal 410. A notifier foreign list template 416 further inherits from foreign list template 404.

The subclasses of foreign pointers contain additional specialized behavior to aid in memory management. An enclosing object having a notifier_pointer_to pointer pointing to a foreign object may perform operations immediately prior to the deletion of the foreign object. A locked_pointer_to pointer, once it is set to point to an object, cannot be changed. Further, a locked_pointer_to pointer provides exception handling when the object it points to is deleted. A pointer_to_immortal pointer also throws an exception when the object it points to is being deleted. Notifier foreign list behaves much like a notifier_pointer_to pointer and also provides advanced notification that a foreign object is about to be deleted.

Figure 10:
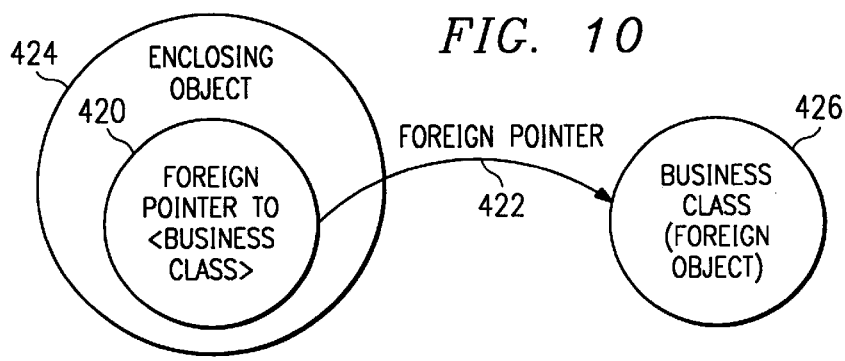
FIG. 10 is a simplified block diagram of a foreign_pointer_to foreign pointer.
Figure 11:
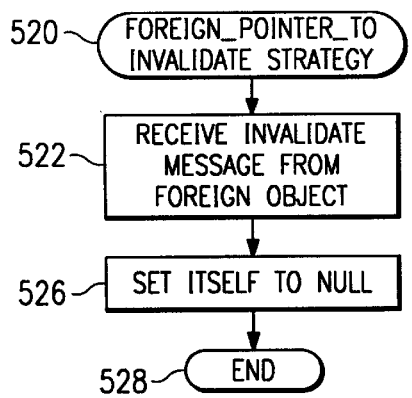
FIG. 11 is a simplified flowchart of an exemplary foreign pointer invalidate process.

Referring to FIG. 10, a block diagram of a foreign_pointer_to pointer 420, which acts like an anonymous pointer, is enclosed by an enclosing object 424 and pointing to a foreign object 426. Instead of declaring a pointer to a business class derived from the foreign object class, the programmer declares a foreign_pointer_to <business class> to use foreign_pointer_to pointers. Foreign_pointer_to is a template containing an actual pointer 422 to the business class, initialized to NULL if the programmer did not initialize it. This eliminates a common source of error resulting from uninitialized pointers.

Operators included in the foreign_pointer_to template allow the programmer to use the foreign pointer as if it were a regular C++ pointer. However, as shown in the flowchart beginning in block 520 in FIG. 11, when foreign_pointer_to receives an "Invalidate" message indicating that foreign object 426 is deleted (block 522), foreign pointer 422 is reset to NULL to eliminate the wild pointer that would otherwise result (block 526) before terminating in block 528.

For foreign_pointer_to pointers, an ownership variable is further provided to implement whether remote ownership is implemented. If ownership is set to true, the foreign object pointed to is automatically deleted when the pointer no longer points to it. Implemented in this unique manner, remote ownership status may be turned on or off.

Figure 12:
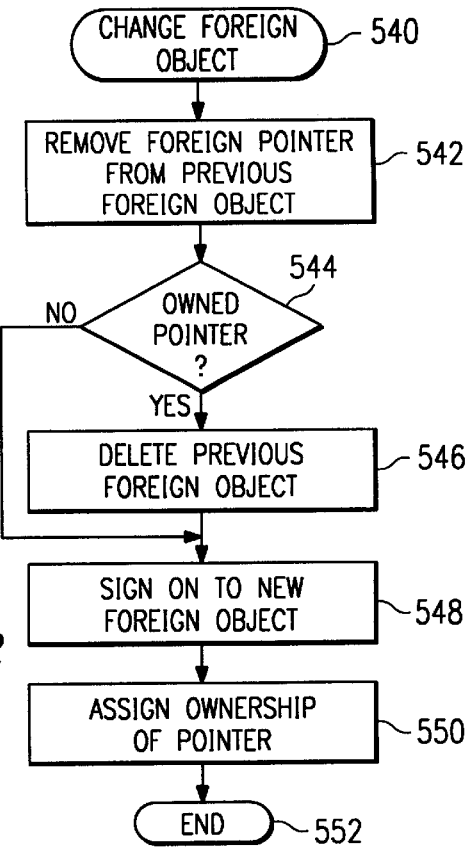
FIG. 12 is a simplified flowchart of an exemplary change foreign object process.

FIG. 12 is a flowchart of an exemplary change foreign object process flow, beginning in block 540. Change foreign object is used to take a foreign pointer off a first foreign object and then point it to a second foreign object. In block 542, the foreign pointer is removed from the first foreign object by executing the exemplary process flow shown in FIG. 7. If the ownership variable of the foreign pointer is true, as determined in block 544, then the first foreign object is deleted automatically, as shown in block 546. The foreign pointer then signs on to the second foreign object by following the process flow shown in FIG. 3, as shown in block 548. In block 550, the ownership of the foreign pointer is then determined. The process ends in block 552.

Figure 13:
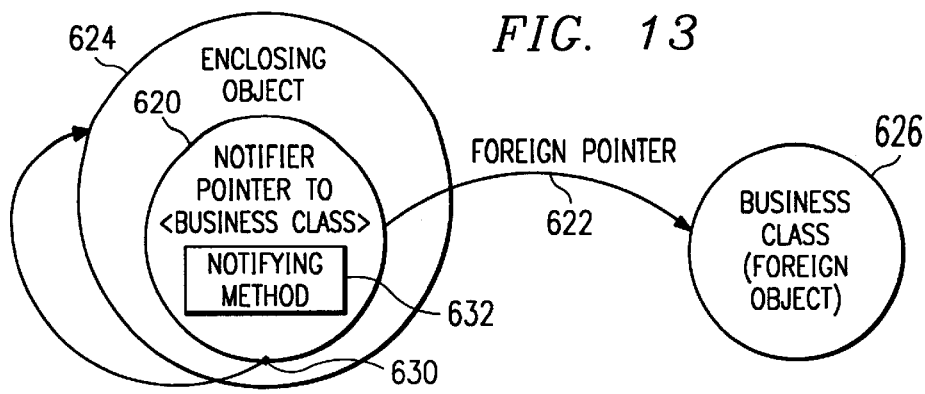
FIG. 13 is a simplified block diagram of a notifier_pointer_to foreign pointer.

Referring to FIG. 13, a diagram of a notifier_pointer_to pointer derived from the foreign_pointer_to template is shown. Frequently an object 624 may need to perform other actions when the pointer 620 it contains is reset, as in the case when the foreign object 626 it points to is being deleted.

Notifier_pointer_to contains a back pointer 630 to enclosing object 624 and a notifying method 632. Notifying method 632 is used to notify enclosing object 624 of foreign object 626's impending demise via back pointer 630. Thus, prior to the deletion of foreign object 626, enclosing object 624 is notified so that it may perform needed actions before foreign object 626 is deleted, such as obtaining certain information from foreign object 626. As set forth above and in FIG. 4, the programmer may insert a call to a will invalidate method or strategy in the destructor (bottom-most layer) of foreign object 626 to initiate the advance notification to enclosing object 624.

FIG. 14 is an exemplary implementation of a notifier_pointer_to will invalidate strategy, beginning in block 640. Notifier_pointer_to pointer receives the "Will invalidate" message from the foreign object that is about to be deleted, as shown in block 642. This causes a call to notifying method 632 (FIG. 13), as shown in block 644. Notifying method 632 may use back pointer 630 to enclosing object 624 to provide advance notification that foreign object 626 will soon be deleted. Enclosing object 624, upon receiving the notification, may then proceed to perform operations that require foreign object 626's cooperation. Without the use of notifier foreign pointers, enclosing object 624 would not have the opportunity to perform these operations prior to the deletion of the foreign object.

Referring to FIG. 15 for an exemplary invalidate strategy 660 for the specialized foreign pointer, pointer_to_immortal. Recall from the foregoing that foreign objects being pointed to by pointer_to_immortal are not to be destroyed. Thus, when the foreign object issues the "invalidate" message, pointer_to_immortal receives the message and responds by throwing an exception, as shown in blocks 662 and 664. Execution then ends in block 666. The programmer may decide what operations are performed during exception handling.

Recall that locked_pointer_to is a class of foreign pointers that inherit its behaviors from pointer_to_immortal. FIG. 16 is a flowchart of an exemplary change foreign object method for locked_pointer_to pointers 680. A determination is made in block 682 whether the pointer is set to NULL, i.e. not pointing to any object. If the pointer is not set to NULL, then a predetermined value, such as boolean false, is returned to indicate that no change was made, as shown in block 684. Otherwise, the foreign pointer change foreign object method shown in FIG. 12 and described above is followed, as shown in block 686, to change the locked_pointer_to pointer from a first foreign object to a second foreign object. The process ends in block 688.

In addition to pointers to single foreign objects, a foreign list of pointers to multiple foreign objects is also provided by the framework of the present invention, as first described above in conjunction with FIG. 9. As shown in FIG. 17, foreign list 800 is a foreign pointer that contains multiple conventional, i.e. non-foreign, pointers 802–806, which point to respective foreign objects 810–814. Each foreign object has three lists, active, passive and restrictive 820–824, that refer back to foreign list 800, but not pointers 802–806.

FIG. 18 is an exemplary process flow for foreign list add foreign object strategy 840. The foreign object is first added to the foreign list, as shown in block 842. This may be done by assigning a foreign list pointer 802 to point to the foreign object. If the foreign object was successfully added, as determined in block 844, then the appropriate list (active, passive, or restrictive depending on the type of foreign list) of the newly added foreign object is updated to reflect the addition of foreign list pointer. The process then terminates in block 848. If the addition of the foreign object is not successful, step 848 is skipped.

To remove a foreign object from the foreign list, the exemplary process flow 860 shown in FIG. 19 may be followed. The foreign list is first removed from the foreign pointer pursuant to the exemplary process shown in FIG. 7, as shown in block 862. The foreign object is then removed from the foreign list, as shown in block 864. The process ends in block 866.

A foreign list invalidate strategy 880 is shown in FIG. 20. This strategy is executed when a foreign object pointed to by one of the foreign list's pointers is being deleted. Foreign list first receives the "Invalidate" message (or optionally the "Will invalidate" message) from the foreign object, as shown in block 882. The pointer pointing to that foreign object is then deleted or set to NULL, as shown in block 884. The process ends in block 886.

A foreign list may also have notifier_pointer_to behavior, shown as notifier foreign list template 416 in FIG. 9. As shown in FIG. 21, notifier foreign list 900 is a also foreign pointer that contains multiple normal pointers 902–906, which point to respective foreign objects 910–914. Notifier foreign list 900 is recorded on the appropriate pointer list (active, passive, or restrictive) of each foreign object 920–924. Notifier foreign list 900 is contained within an enclosing object 930 that uses it to point to the foreign objects. Notifier foreign list 900 further includes a notifier method 932 that functions in a similar manner as the notifier method for notifier_pointer_to. Notifier foreign list 900 further has a pointer 934 pointing to enclosing object 930 to provide the advance notification upon receipt of the "Will invalidate" message from one of the foreign objects.

Although the present invention and its advantages have been described in detail, it should be understood that various changes, substitutions and alterations can be made therein without departing from the spirit and scope of the invention as defined by the appended claims.

What is claimed is:

1. A computer-implemented object-oriented memory management framework, comprising:
   a set of foreign pointer objects each encapsulating a plurality of memory management methods and variables, said set of foreign pointer objects operable for instantiating one or more instances of active, passive, and restrictive foreign pointers;
   a set of foreign objects encapsulating a plurality of memory management methods and variables, operable for instantiating one or more instances of foreign objects, each foreign object having an active list variable, a passive list variable, and a restrictive list variable for recording therein any active, passive, and restrictive foreign pointer pointing thereto; and
   means for pointing an instance of the foreign pointer object to memory allocated to a foreign object defined in a computer application and deleting said foreign object according to said memory management methods and variables.

2. The framework, as set forth in claim 1, wherein said pointing means comprises:

means for pointing an active foreign pointer object at one or more foreign objects for indicating said one or more foreign objects are not to be destroyed when they are only pointed to by active foreign pointer objects; and said active list variable recording said active foreign pointer object therein.

3. The framework, as set forth in claim 1, wherein said pointing means comprises:

means for pointing a passive foreign pointer object at one or more foreign objects for indicating said one or more foreign objects are to be destroyed when they are only pointed to by passive foreign pointer objects; and said passive list variable recording said passive foreign pointer object therein.

4. The framework, as set forth in claim 1, wherein said pointing means comprises:

means for pointing a restrictive foreign pointer object at one or more foreign objects for indicating said one or more foreign objects are not to be destroyed when said restrictive foreign pointer object is pointing thereto; and said restrictive list variable recording said restrictive foreign pointer object therein.

5. The framework, as set forth in claim 1, wherein said set of foreign pointer objects further comprises a set of foreign_pointer_to foreign pointer objects for providing instances of foreign pointer objects to a single foreign object.

6. The framework, as set forth in claim 5, wherein said set of foreign_pointer_to foreign pointer objects further comprises a set of notifier_pointer_to foreign pointer objects for providing an instance of a notifier foreign pointer object encapsulating a notification method and a back pointer pointing to an object enclosing said notifier foreign pointer object for advance notification thereto prior to said foreign object being deleted.

7. The framework, as set forth in claim 6, wherein said set of notifier_pointer_to foreign pointer objects further comprises:

a will invalidate method for calling said notification method upon receipt of a will invalidate message from said foreign object; and an invalidate method for setting said notifier_pointer_to foreign pointer instance to NULL upon receipt of an invalidate message from said foreign object.

8. The framework, as set forth in claim 5, wherein said set of foreign_pointer_to foreign pointer objects further comprises a set of pointer_to_immortal foreign pointer objects for providing an instance of foreign pointer object having an invalidate method which throws an exception upon receiving an invalidate message from said foreign object.

9. The framework, as set forth in claim 8, wherein said set of pointer_to_immortal foreign pointer objects further comprises a set of locked_pointer_to foreign pointer objects for providing an instance of foreign pointer object having an invalidate method which does not permit said foreign pointer object to change from pointing to one foreign object to another.

10. The framework, as set forth in claim 1, wherein said set of foreign pointer objects further comprising a set of foreign list objects for providing instances of foreign list objects each being capable of having more than one pointer object pointing to more than one foreign object.

11. The framework, as set forth in claim 10, wherein said set of foreign list objects further comprises a set of notifier foreign list objects for providing an instance of foreign list object having a notification method and a back pointer object to an object enclosing said notifier foreign list object for advance notification thereto prior to one of said foreign objects being deleted.

12. The framework, as set forth in claim 11, wherein said set of notifier foreign list objects further comprises:

a will invalidate method for calling said notification method upon receipt of a will invalidate message from one of said foreign objects; and an invalidate method for setting said notifier_pointer_to foreign pointer instance to NULL upon receipt of an invalidate message from said foreign object.

13. An object-oriented method for memory management in a computer, comprising the steps of:

encapsulating memory management methods and variables in a set of foreign pointer objects, said foreign pointer objects providing one or more instances of active, passive, and restrictive foreign pointer objects;

encapsulating memory management methods and variables in a set of foreign objects for providing one or more instances of foreign objects, each foreign object having an active list variable, a passive list variable, and a restrictive list variable for recording any foreign pointer object pointing thereto; and pointing an instance of a foreign pointer object to memory allocated to a foreign object defined in a computer application and deleting said foreign object according to said memory management methods and variables encapsulated in the foreign pointer object and foreign object.

14. The method, as set forth in claim 13, further comprising the steps of:

signing on an active foreign pointer object for pointing at one or more foreign objects for indicating said foreign object is not to be deleted from the allocated memory when said active foreign pointer object is the only foreign pointer object pointing thereto; and recording in said active list variables of said foreign objects said active foreign pointer object.

15. The method, as set forth in claim 13, further comprising the steps of:

signing on a passive foreign pointer object for pointing at one or more foreign objects for indicating that said foreign object is to be deleted from the allocated memory when said passive foreign pointer object is the only foreign pointer object pointing thereto; and recording in said passive list variables of said foreign objects said passive foreign pointer object.

16. The method, as set forth in claim 13, further comprising the steps of:

signing on a restrictive foreign pointer object for pointing at one or more foreign objects for indicating that said foreign object is not to be deleted from the allocated memory when said restrictive foreign pointer object is pointing thereto; and recording in said restrictive list variables of said foreign objects said restrictive foreign pointer object.

17. The method, as set forth in claim 13, further comprising the step of removing a foreign pointer object from a foreign object.

18. The method, as set forth in claim 17, wherein said foreign pointer object removing step comprises the steps of:
notifying a foreign object that a foreign pointer object pointing thereto is to be removed;
locating said foreign pointer object in one of said active, passive, and restrictive list variables;
deleting said foreign pointer object from said list variables; and
optionally auto self-destroying said foreign object from the allocated memory if no active or restrictive foreign pointers objects remain in said list variables.

19. The method, as set forth in claim 13, further comprising the step of deleting a foreign object.

20. The method, as set forth in claim 19, wherein the foreign object deleting step comprises the steps of:
making a determination of whether any restrictive foreign pointer object is pointing to said foreign object; and
destroying said foreign object in response to determining that no restrictive foreign pointer object is pointing to said foreign object.

21. The method, as set forth in claim 20, wherein said making a determination step comprises the step of making a determination of whether any restrictive foreign pointer object is recorded in said restrictive pointer list variable.

22. The method, as set forth in claim 20, wherein said foreign object destroying step comprises the steps of:
sending an invalidate message to each foreign pointer object pointing to said foreign object;
removing a reference of each foreign pointer object to said foreign object in response to receiving said invalidate message; and
deleting said foreign object.

23. The method, as set forth in claim 22, further comprising the step of setting each foreign pointer object to NULL in response to receiving said invalidate message.

24. The method, as set forth in claim 22, further comprising the step of throwing an exception in response to receiving said invalidate message.

25. The method, as set forth in claim 22, further comprising the steps of:
sending a will invalidate message to each foreign pointer object pointing to said foreign object; and
each foreign pointer object executing a will invalidate strategy in response to receiving said will invalidate message.

26. The method, as set forth in claim 24, wherein said will invalidate strategy executing step comprises the step of notifying an object enclosing each foreign pointer object in response to receiving said will invalidate message.

27. The method, as set forth in claim 26, wherein said notifying step further comprises the steps of:
encapsulating an additional pointer object for pointing to said enclosing object; and
executing a notifying strategy on said enclosing object via said additional pointer object.

28. The method, as set forth in claim 13, further comprising the steps of:
removing a foreign pointer object from a list variable of a first foreign object being pointed to by said foreign pointer object;
making a determination of whether said first foreign object was owned by an object enclosing said foreign pointer object;
deleting said first foreign object in response to said foreign object being owned by said enclosing object;
signing on said foreign pointer object to a second foreign object; and
determining ownership of said second foreign object.

29. The method, as set forth in claim 28, further comprising the step of making a determination whether a foreign pointer object is set to NULL prior to said foreign pointer object removing step in response to said foreign pointer object being set to NULL.

30. The method, as set forth in claim 29, further comprising the step of returning a value indicative of non-performance in response to said foreign pointer object not being set to NULL.

31. The method, as set forth in claim 13, further comprising the steps of:
encapsulating, in one foreign pointer object, more than one foreign pointer objects for pointing to more than one foreign objects; and
each said foreign objects having said active, passive, and restrictive list variable recording said foreign pointer object.

32. The method, as set forth in claim 31, further comprising the steps of:
adding a foreign object to being pointed to by said foreign pointer object; and
adding said foreign pointer object to one of said active, passive, and restrictive list variables of said newly added foreign object.

33. The method, as set forth in claim 31, further comprising the steps of:
removing a foreign object being pointed to by said foreign pointer object; and
removing said foreign pointer object from one of said active, passive, and restrictive list variables of said removed foreign object.

34. The method, as set forth in claim 31, further comprising the steps of:
sending an invalidate message to a foreign pointer object pointing to one of said foreign objects; and
deleting said foreign object from one of said active, passive, and restrictive list variables in response to receiving said invalidate message.

35. The method, as set forth in claim 31, further comprising the steps of:
encapsulating an additional pointer object for pointing to an object enclosing said foreign pointer object; and
executing a notifying strategy on said enclosing object via said additional pointer object.

36. The method, as set forth in claim 13, further comprising the step of inheriting from said set of foreign pointer objects a set of foreign_pointer_to foreign pointer objects for providing a foreign pointer object to a single foreign object.

37. The method, as set forth in claim 13, further comprising the step of inheriting from said set of foreign pointer objects a set of notifier_pointer_to foreign pointer objects for providing an instance of a notifier foreign pointer object encapsulating a notification method and a back pointer pointing to an object enclosing said notifier foreign pointer object for advance notification thereto prior to said foreign object being deleted.

38. The method, as set forth in claim 13, further comprising the step of inheriting from said set of foreign pointer objects a set of pointer_to_immortal foreign pointer objects for providing an instance of foreign pointer object encapsulating an invalidate method which throws an exception upon receiving an invalidate message from said foreign object.

39. The method, as set forth in claim 13, further comprising the step of inheriting from said set of foreign pointer objects a set of locked_pointer_to foreign pointer objects for providing an instance of foreign pointer object encapsulating an invalidate method which throws an exception when said foreign pointer object instance is changed from pointing to one foreign object to another.

40. The method, as set forth in claim 13, further comprising the step of inheriting from said set of foreign pointer objects a set of foreign list objects for providing instances of foreign objects each being capable of having more than one pointer object pointing to more than one foreign object.

41. The method, as set forth in claim 13, further comprising the step of inheriting from said set of foreign pointer objects a set of notifier foreign list objects for providing an instance of foreign list objects encapsulating a notification method and a back pointer to an object enclosing said notifier foreign list object instance for advance notification thereto prior to one of said foreign objects being deleted.

* * * * *